Aug. 9, 1938.  G. C. SCHAUB  2,126,414
DEVICE FOR COMBINING REGULATED QUANTITIES OF MATERIALS
Filed Aug. 29, 1935  4 Sheets-Sheet 1

INVENTOR
Gordon C. Schaub
BY Paul R. Ames
ATTORNEY

Aug. 9, 1938.     G. C. SCHAUB     2,126,414
DEVICE FOR COMBINING REGULATED QUANTITIES OF MATERIALS
Filed Aug. 29, 1935     4 Sheets-Sheet 2
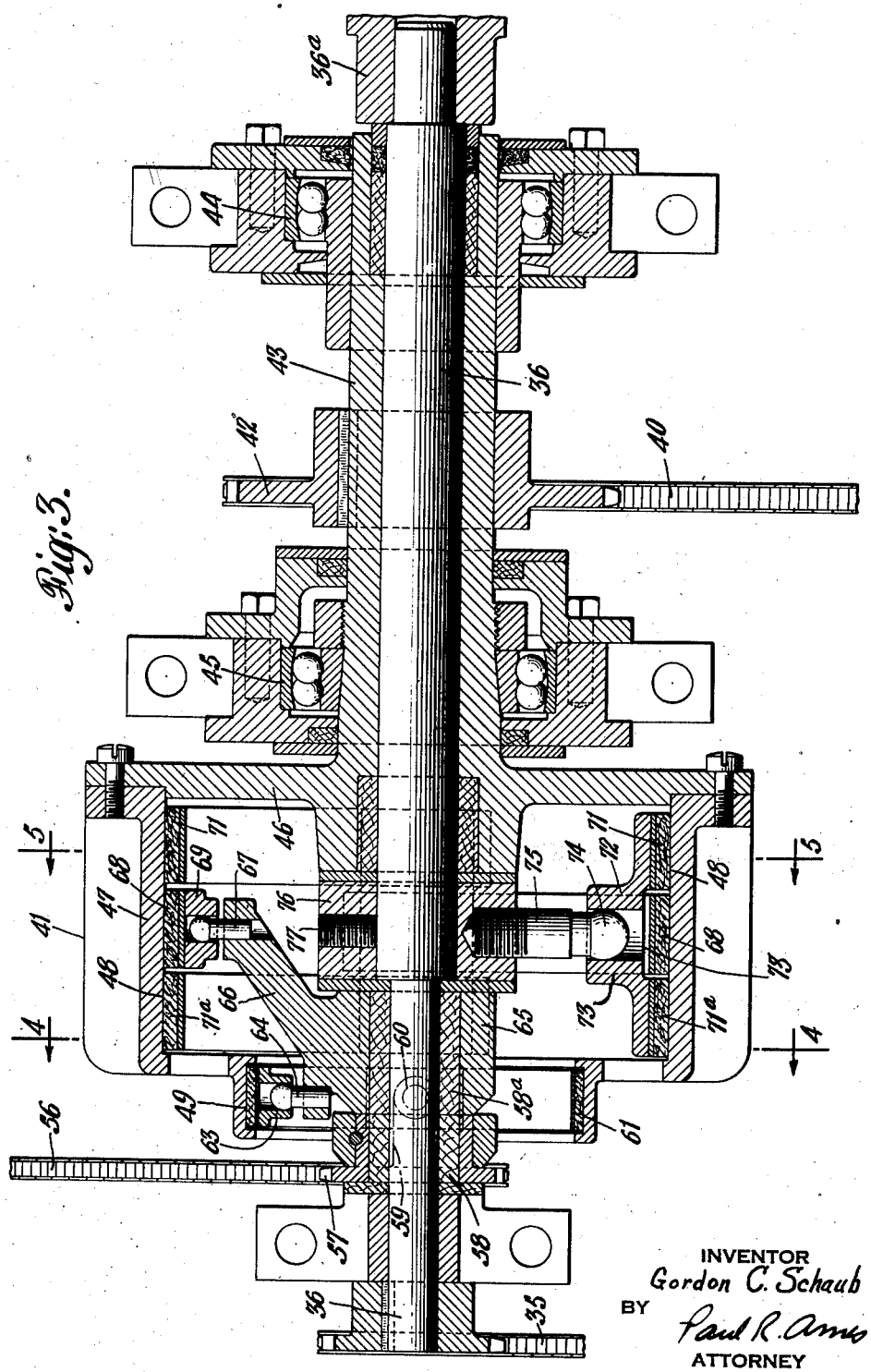
INVENTOR
Gordon C. Schaub
BY
Paul R. Ames
ATTORNEY

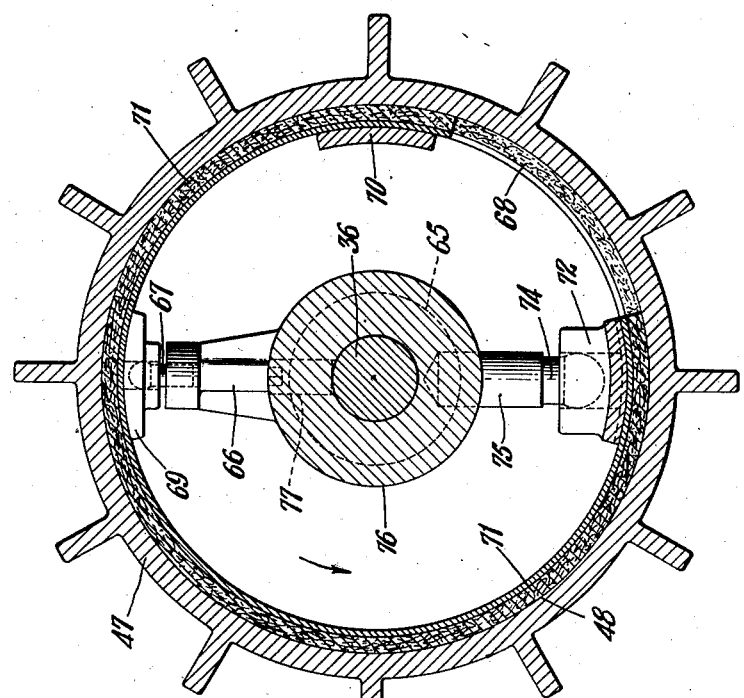

Aug. 9, 1938. G. C. SCHAUB 2,126,414
DEVICE FOR COMBINING REGULATED QUANTITIES OF MATERIALS
Filed Aug. 29, 1935 4 Sheets-Sheet 4
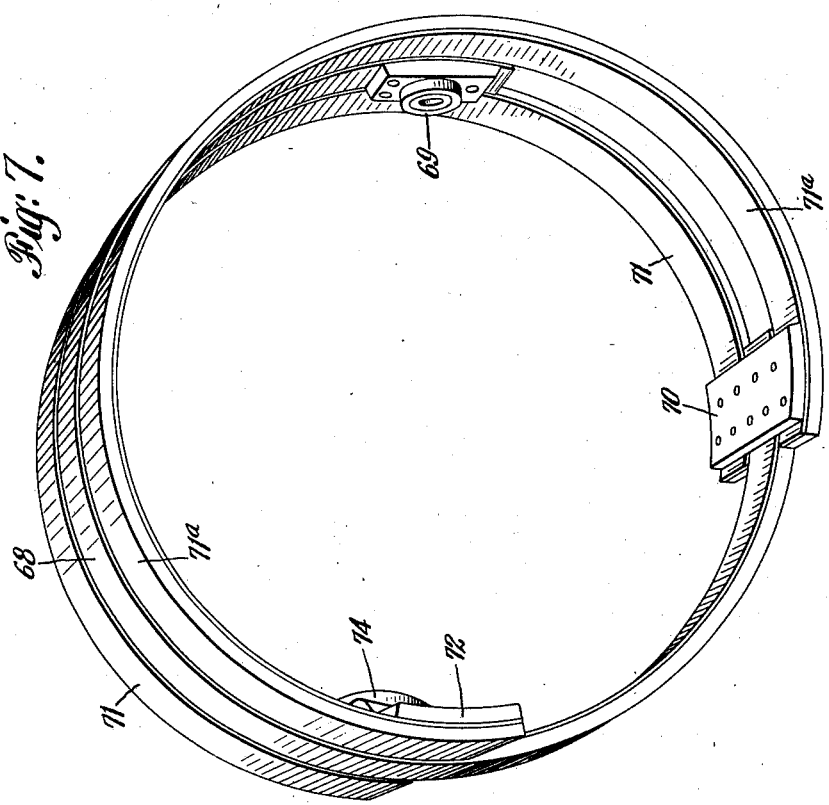
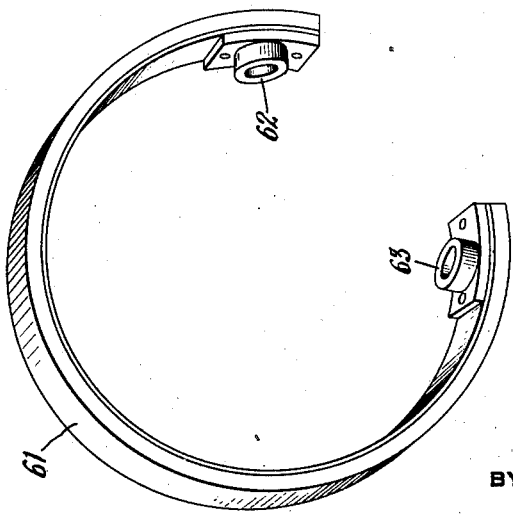
INVENTOR
Gordon C. Schaub
BY
Paul R Ames
ATTORNEY Patented Aug. 9, 1938

2,126,414

UNITED STATES PATENT OFFICE 2,126,414

DEVICE FOR COMBINING REGULATED QUANTITIES OF MATERIALS

Gordon C. Schaub, Bayonne, N. J., assignor to The Best Foods, Inc., New York, N. Y., a corporation of Delaware Application August 29, 1935, Serial No. 38,360

10 Claims. (Cl. 259—18)

This invention relates to a device for supplying measured quantities of liquid and granular material, such, for example, as milk and salt, to a moving stream of plastic material, such as a butter substitute.

In the manufacture of butter substitute from cocoanut oil and cultured milk emulsion, it is the practice, as described in the application of Jacob Schaub, Serial No. 621,653, filed July 9, 1932, now Patent Number 2,077,644 issued April 20, 1937, to add salt and milk to the plastic stream of butter substitute as it passes from the water expeller to the final worker. The present invention is concerned with an improvement in the device for adding the salt and milk, which was described in that application and more fully in the application of Jacob Schaub and Gordon C. Schaub, Serial No. 621,653, filed July 9, 1932, now Patent Number 2,020,435 issued November 12, 1935.

It is an object of the present invention to provide an improved device in which the actuation of the conveyors for the ingredients being added are driven through a motor, or other suitable means, in accordance with the movement of the material to which the ingredients are to be added. A further object is to provide an improved clutch mechanism by means of which the rotation of the main drive shaft may be transmitted to the shaft which operates the conveyors, in accordance with the movement of the material to which the other ingredients are being added. Other objects will become apparent.

In describing the invention, reference will be made to its use in the addition of salt and milk in a system such as that described in the aforesaid patents, although it is not intended to limit it to this particular use, since it will be obvious that it may be used in other systems and for the addition of other materials.

An embodiment of the invention is illustrated in the drawings, in which Figure 1 is a vertical section through the cabinet, showing the mechanism within it, certain portions being broken away to show the mechanism behind them.

Figure 3 is an enlarged vertical section of the clutch mechanism taken on the center line of the shaft, the ball and socket connections to the first friction band, which would not normally show in this view, being shown in dot and dash lines to indicate its position relative to the other parts of the mechanism.

Figures 1, 2:
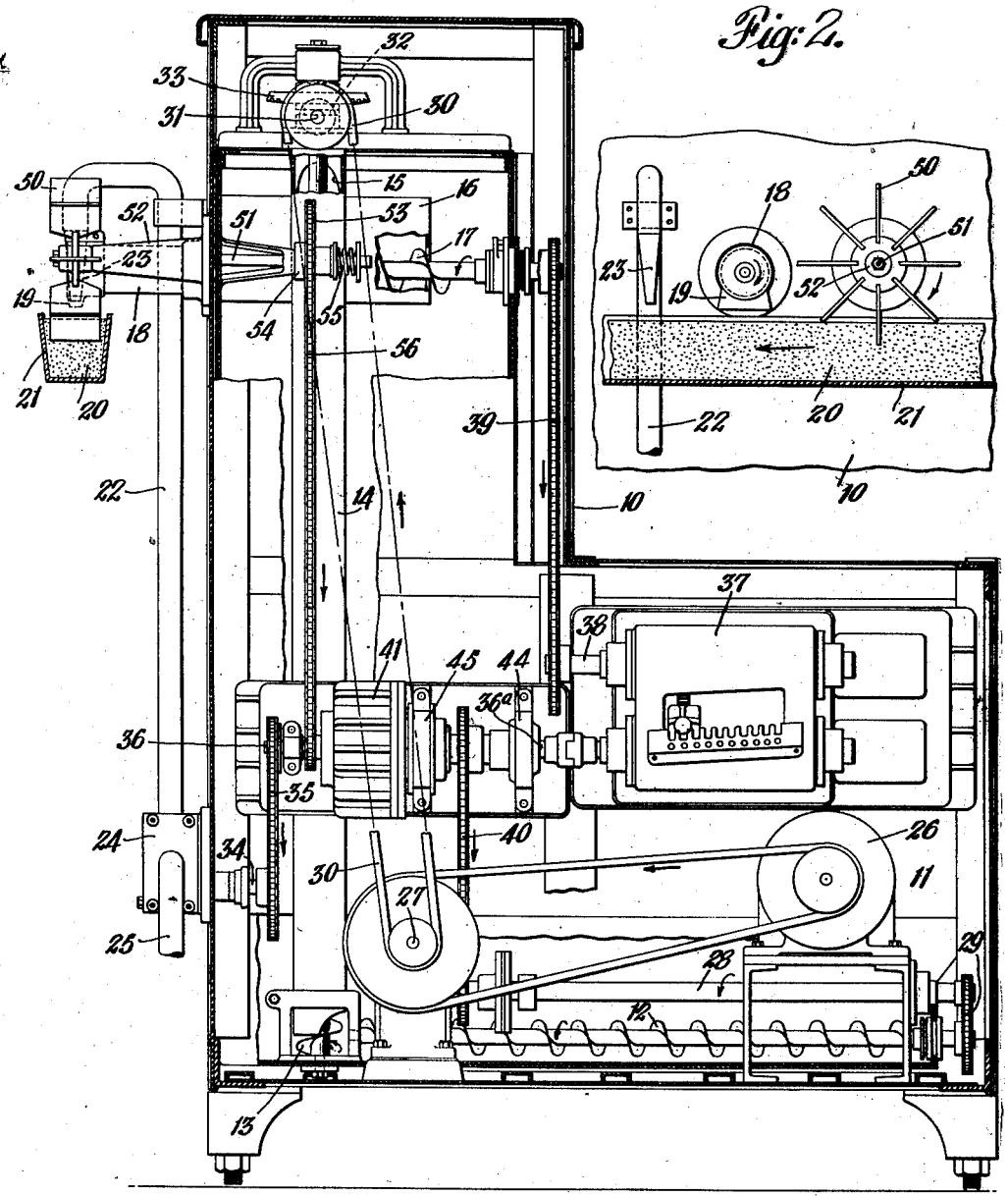
Figure 2 is a fractional side elevation of a portion of the device.

Figures 4 and 5 are sections on the lines 4—4 and 5—5 respectively, of Figure 3.

Figures 6 and 7 are perspective views of the friction bands employed in the clutch mechanism.

The cabinet 10 encloses the mechanism for actuating the conveyors and at one side is provided with a bin 11 for salt, having slanting sides and provided with a horizontal screw conveyor 12 for moving the salt toward a vertically disposed screw conveyor 13 within a cylindrical casing 14. The upper end of the casing 14 is provided with an opening 15 at one side by which the salt is discharged into a trough 16. A horizontally disposed screw conveyor 17 is positioned at the bottom of the trough 16 and extends through a casing 18 having a discharge nozzle 19 at its outer end through which the salt is discharged to the butter substitute 20 moving through the trough 21, extending, for example, from the water expeller to the blender of a system, as illustrated in the aforesaid patents.

The milk is supplied through the pipe 22 to the nozzle 23 by the measuring pump 24 connected with a source of supply of milk through the pipe 25.

The motor 26 drives a shaft 27 through a belt and pulleys. One end of the shaft 27 extends into a reduction gear box and is connected through the gears in this box to the shaft 28. The screw conveyor 12 is driven from the shaft 28 through the chain 29 connecting sprockets keyed to the shafts 12 and 28. The vertical conveyor screw 13 is driven from the shaft 27 through a belt 30 (which is preferably positioned outside of the salt bin but inside of cabinet 10), a shaft 31, a pinion 32 on the shaft 31 and a bevel gear 33 fixed to the shaft of the screw conveyor 13.

The pump 24 is actuated by the shaft 34 which is driven by the chain 35 from the shaft 36. The horizontal screw conveyor 17 is also driven from the shaft 36 through the extension 36a of the shaft 36, a speed change mechanism of standard construction, illustrated at 37, the shaft 38 and the chain 39 running over sprockets fixed to the shafts 17 and 38. The shaft 36 is driven from the shaft 28 through the chain 40 and the clutch mechanism, which is illustrated generally at 41 and is shown in detail in Figures 3, 4 and 5.

Referring to Figure 3, the sprocket 42, driven by the chain 40, is keyed to the hollow shaft 43, surrounding the shaft 36 and supported in the bearings 44 and 45 in such a manner that the shaft 36 and the sleeve 43 may rotate independently of each other. The hollow shaft 43 has a flange 46 at one end, which has fixed to it the drum 47 having an internal bearing surface 48 and an internal bearing surface 49, the latter bearing surface being of reduced diameter as compared with the surface 48.

The clutch 41 is actuated by the paddle wheel 50, which is fixed to the shaft 51 supported in the bearing 52, and is positioned so that its blades project into the stream of plastic butter substitute 20 in the trough 21 (see Figures 1 and 2). A sprocket 53 is pressed against a collar 54, fixed to the shaft 51, by the coil spring 55, in such a manner that upon normal operation of the paddle wheel 50, the sprocket 53 will rotate with the shaft 51. If the force on the paddle wheel 50 becomes excessive, however, the sprocket 53 will slip on the shaft 51 and thus prevent bending of the blades of the paddle wheel 50 or other damage to the drive mechanism.

The chain 56 drives the sprocket 57 from the sprocket 53. The sprocket 57 is free to rotate on the shaft 36, a bushing 58, of fibre or other suitable material, being positioned between the moving surfaces. An arm 59 is fixed to and extends from the collar of the sprocket 57 and is provided at its outer end with a ball-headed pin 60 forming a portion of the ball and socket connection between the sprocket 57 and the friction band 61. The brake band 61 bears against the surface 49 of the drum 47 and has fixed to one end a socket 62 to receive the ball-headed pin 60. A second socket 63 is fixed to the other end of the friction band 61 to receive a ball-headed pin 64 which is rigidly fastened to the collar 65. The collar 65 is also free to rotate upon the shaft 36, a bushing 58a similar to 58 being positioned within the collar.

The collar 65 is provided with an arm 66 carrying a ball-headed pin 67 at its outer end. A friction band 68 bears against the middle portion of the surface 48 of the drum 47, which friction band is provided at one end with a socket 69 to receive the ball-head of the pin 67. The other end of the friction band 68 is rigidly connected by means of a bar 70 to the ends of two friction bands 71 and 71a positioned on opposite sides of the band 68 and also adapted to bear upon the surface 48 of the drum 47. The other ends of the bands 71 and 71a are rigidly connected together by a plate 72 having an arched portion at 73 to permit the band 68 to move freely under it. A socket 74 in the plate 72 receives the ball-head of the pin 75, which pin is fixed rigidly to the collar 76. The collar 76 is around the shaft 36 and is fixed to rotate with it by means of the set screw 77.

In operating my improved machine, the salt is placed in the trough 11 within the casing and the pump 25 is connected with a source of supply of milk through the pipe 25. The motor 26 is started whereby the screw conveyor 12 and the screw elevator 13 are actuated to feed salt to the trough 16. While the motor 26 is running, the collar 43 and the drum 47 are rotated by the chain and sprocket connection between the shaft 28 and the collar 43. While the paddle wheel 50 is not moving, the clutch 41 is disengaged and the shaft 36 is still, so that no salt or milk is being fed to the butter substitute.

As the butter substitute 20 moves through the trough 21, it rotates the paddle wheel 50 which actuates the chain 56 to turn the collar 58 about the shaft 36 in the direction of rotation of the drum 47 (clockwise as viewed from the left of Figure 1). This movement of the collar 58 causes the friction band 61 to expand and bear upon the rotating surface 49. When sufficient force is applied to the friction band to make it grip the surface 49, the collar 65 will be turned with the drum 47. This in turn will cause the friction bands 68, 71 and 71a to expand and grip the surface 48, whereby the shaft 36 will be rotated through the friction bands 68, 71 and 71a and the pin 75. The rotation of the shaft 36 (in a clockwise direction as viewed from the left in Figures 1 and 3) will actuate the milk pump through the chain 35 and will rotate the salt conveyor screw 17 (in a clockwise direction) through the speed change device 37 and the chain 39. The rate of feed of the salt screw may be adjusted by means of the speed change device to give the desired rate of delivery of salt and the rate of feed of milk by the pump may be varied by adjusting the pump or varying the ratio of the sprockets, to give the desired ratio of milk to salt.

The sprocket 57 rotates in the same direction as the drum 47 and during normal operation of the clutch device the friction band should never attain the same speed as the drum, i. e., there should be continuous slippage between the bands and drum. As the bands are opened in the direction of rotation the drum tends to increase the opening of the bands by applied friction on the bands. The speed of the sprocket 57, therefore, not only starts this work action but also checks it, by allowing the bands to open only to a point where sufficient friction has been applied, or sufficient work energy collected. This principle may be compounded as many times as may be required. The speed of the sprocket 57 controls the amount of slippage and so regulates the speed of the mechanism for feeding salt and milk.

The ball and socket joints between the friction bands permit sufficient relative movement to prevent binding during the operation of the clutch. The several friction bands connected in series permits the force of the paddle wheel 50 to be augmented by the drum 47 driven by the motor and so reduces the load upon plastic material during the actuation of the conveyors.

When the movement of the butter substitute 20 is retarded or stops, the friction bands will loosen their grip and the collar 43 will rotate relative to the shaft 36, thus discontinuing the feed of salt and milk.

It is apparent that many modifications of the invention may be made and that it may be applied to other uses and it is not intended to limit it to the particular embodiment or use shown. For example, other clutch mechanisms may be used whereby the actuating means for the conveyors may be accurately regulated in accordance with the movement of the material to which the ingredients are being added.

The terms used in describing the invention have been used in their descriptive sense and not as terms of limitation and it is intended to include within the scope of the appended claims all equivalents of the terms used.

What I claim is:
1. A device for combining regulated quantities of materials, comprising a conveyor for one of the materials, means for actuating said conveyor, a clutch positioned between the said conveyor and the means for actuating it, and means for actuating said clutch by the movement of the other material to regulate the movement of the conveyor by the actuating means for the conveyor.

2. A device for combining regulated quantities of materials, comprising a conveyor for one of the materials, means for actuating said conveyor, a clutch positioned between the said conveyor and the means for actuating it, said clutch including a rotating drum and a friction band adapted to bear upon said drum, and means for actuating the clutch by the movement of the other material to regulate the movement of the conveyor by the actuating means for the conveyor.

3. A device for combining regulated quantities of materials, comprising a conveyor for one of the materials, means for actuating said conveyor, a clutch positioned between the said conveyor and the means for actuating it, said clutch including a rotating drum and a plurality of friction bands connected serially to each other and adapted to bear upon said drum, and means for actuating said friction bands by the movement of the other material to regulate the movement of the conveyor by actuating means for the conveyor.

4. A device for adding a granular material to a plastic material moving in a stream comprising a conveyor for the granular material, means for actuating said conveyor, a clutch between the said conveyor and the means for actuating it, a paddle wheel having blades adapted to cut into said plastic material and be actuated by the movement of it, and means for actuating said clutch by the movement of said paddle wheel.

5. A device as defined by claim 4 including means actuated by the means for actuating the conveyor, for conveying a liquid to said plastic material.

6. A device as defined in claim 4 in which the clutch includes a rotating drum driven by the means for actuating the conveyor and a friction band driven by the paddle wheel and adapted to bear upon the surface of said drum.

7. A device as defined in claim 4 in which the clutch includes a rotating drum driven by the means for actuating the conveyor, a plurality of friction bands connected in series and adapted to bear upon the surface of said rotating drum, said friction bands being actuated by said paddle wheel.

8. In a friction clutch, a rotatable drum having separate surfaces, a shaft within said drum, a pair of bands arranged to each grip one of said surfaces of said drum, a member rotatably mounted on said shaft and connected directly to an end of each of said bands, means connecting the other end of one of said bands to a driven member, and means connected to the other end of the other of said bands for expanding or contracting said other band.

9. A device as defined in claim 8 in which the separate surfaces of the drum and the bands have different diameters and the larger band is connected to the driven member.

10. A device as defined in claim 8 including means for rotating the drum so that driving power is transmitted to the driven member from a separate source in accordance with the speed of the expanding and contracting means.

GORDON C. SCHAUB.